United States Patent
Munk-Hansen

(10) Patent No.: US 8,636,468 B2
(45) Date of Patent: Jan. 28, 2014

(54) ARRANGEMENT WITH A NACELLE AND AN INSTRUMENT BAR

(75) Inventor: Thorkil Munk-Hansen, Give (DK)

(73) Assignee: Siemens Aktiengesellschaft, Munich (DE)

( * ) Notice: Subject to any disclaimer, the term of this patent is extended or adjusted under 35 U.S.C. 154(b) by 591 days.

(21) Appl. No.: 12/941,120

(22) Filed: Nov. 8, 2010

(65) Prior Publication Data
US 2011/0123334 A1 May 26, 2011

(30) Foreign Application Priority Data
Nov. 24, 2009 (EP) .................................... 09014631

(51) Int. Cl.
F03D 11/00 (2006.01)

(52) U.S. Cl.
USPC ........................................................... 416/61

(58) Field of Classification Search
USPC .......................................................... 416/142
See application file for complete search history.

(56) References Cited

U.S. PATENT DOCUMENTS 3,260,305 A   7/1966   Leonard et al.
5,140,856 A   8/1992   Larsen

FOREIGN PATENT DOCUMENTS

| DE | 4426633 A1 | 2/1996 |
| EP | 1577550 A2 | 9/2005 |
| FR | 2473642 A1 | 7/1981 |
| WO | WO 2005016749 A1 | 2/2005 |
| WO | WO 2006010783 A1 | 2/2006 |

*Primary Examiner* — Nathaniel Wiehe
*Assistant Examiner* — Jeffrey A Brownson

(57) ABSTRACT

An arrangement with a nacelle and an instrument bar is provided. The instrument bar is arranged on top of the nacelle. A rotational axis interacts with the nacelle and with the instrument bar. The rotational axis is constructed and arranged such that the instrument bar is allowed to pivot between a first position and a second position in reference to the top side of the nacelle. The instrument bar projects above the top side of the nacelle when locked in the first position, while the instruments are operated. The instrument bar is locked close to the top side of the nacelle in the second position to allow access to the instruments.

9 Claims, 4 Drawing Sheets

ARRANGEMENT WITH A NACELLE AND AN INSTRUMENT BAR

CROSS REFERENCE TO RELATED APPLICATIONS

This application claims priority of European Patent Office Application No. 09014631.7 EP filed Nov. 24, 2009, which is incorporated by reference herein in its entirety.

FIELD OF INVENTION

The invention relates to an arrangement with a nacelle of a wind turbine and with an instrument bar. The instrument bar is located on top of the nacelle and is used to support instruments, which are needed for the wind turbine. The instruments may be used to measure parameters of the environment or may be used for warning purposes, etc.

SUMMARY OF INVENTION

The instruments need to be maintained, changed or repaired during the life time of the wind turbine. Thus personal has to leave the nacelle for this purpose. This task is dangerous due to the height of the wind turbine and due to the weather, especially for wind turbines located offshore.

The instrument bar needs to be placed on top of the nacelle at a planned site with a crane. Thus personal has to climb out of the nacelle to direct the crane and to fix the instrument bar at the nacelle. This task is dangerous, too.

It is an object of the present invention to provide an improved arrangement with the nacelle and the instrument bar, which allows a safe and reliable work during the installation and for maintenance purposes.

This object is achieved by the independent claim. Preferred configurations are object of the dependent claims.

According to the invention the arrangement contains a nacelle and an instrument bar. The instrument bar is arranged on top of the nacelle. A rotational axis interacts with the nacelle and with the instrument bar. The rotational axis is constructed and arranged in a way that the instrument bar is allowed to pivot between a first position and a second position in reference to the top side of the nacelle. The instrument bar projects above the top side of the nacelle if locked in the first position, while the instruments are operated. The instrument bar is locked close to the top side of the nacelle in the second position to allow access to the instruments.

If the instrument bar is turned in the second position maintenance work can be done from inside the nacelle very easily and without danger.

Preferably the instrument bar and a radiator of the wind turbine are turned to a rear side of the nacelle by help of a second rotational axis. Thus they do not project above the nacelle or do only project by a minimum height above the nacelle. Thus a resulting component is built, which contains the nacelle, the radiator and the instrument bar. This allows an easy transport of the whole component to a wind turbine site. Furthermore there is no longer the need to use a crane for the installation of the instrument bar and for the installation of the radiator on top of the nacelle.

Additionally the component shows a predefined minimum height, if the radiator and the instrument bar are tuned to the rear side of the nacelle. Thus barriers in reference to the height of the component (like tunnels or bridges) are overcome.

According to the invention the instrument bar and/or the radiator are installed and connected in a controlled production facility. It is no longer necessary to transport the nacelle, the radiator and/or the instrument bar as separate components to the site.

Preferably the instrument bar and the nacelle are connected by flexible communication lines, which are used for the needed communication between the nacelle and the instrument bar.

According to the invention there is no longer the need to use a crane for the installation of the radiator and/or the instrument bar to the nacelle at the site. Thus personal do not longer have to climb on top of the nacelle to install and fixate them in their individual position.

According to the invention there is no longer the need for a separated shipment of the radiator, the nacelle and the instrument bar to the site, as they are connected in a production-facility before.

BRIEF DESCRIPTION OF THE DRAWINGS

The invention is described now in more detail by help of figures. The figures show different examples and do not limit the scope of the invention.

DETAILED DESCRIPTION OF INVENTION

Figure 1:
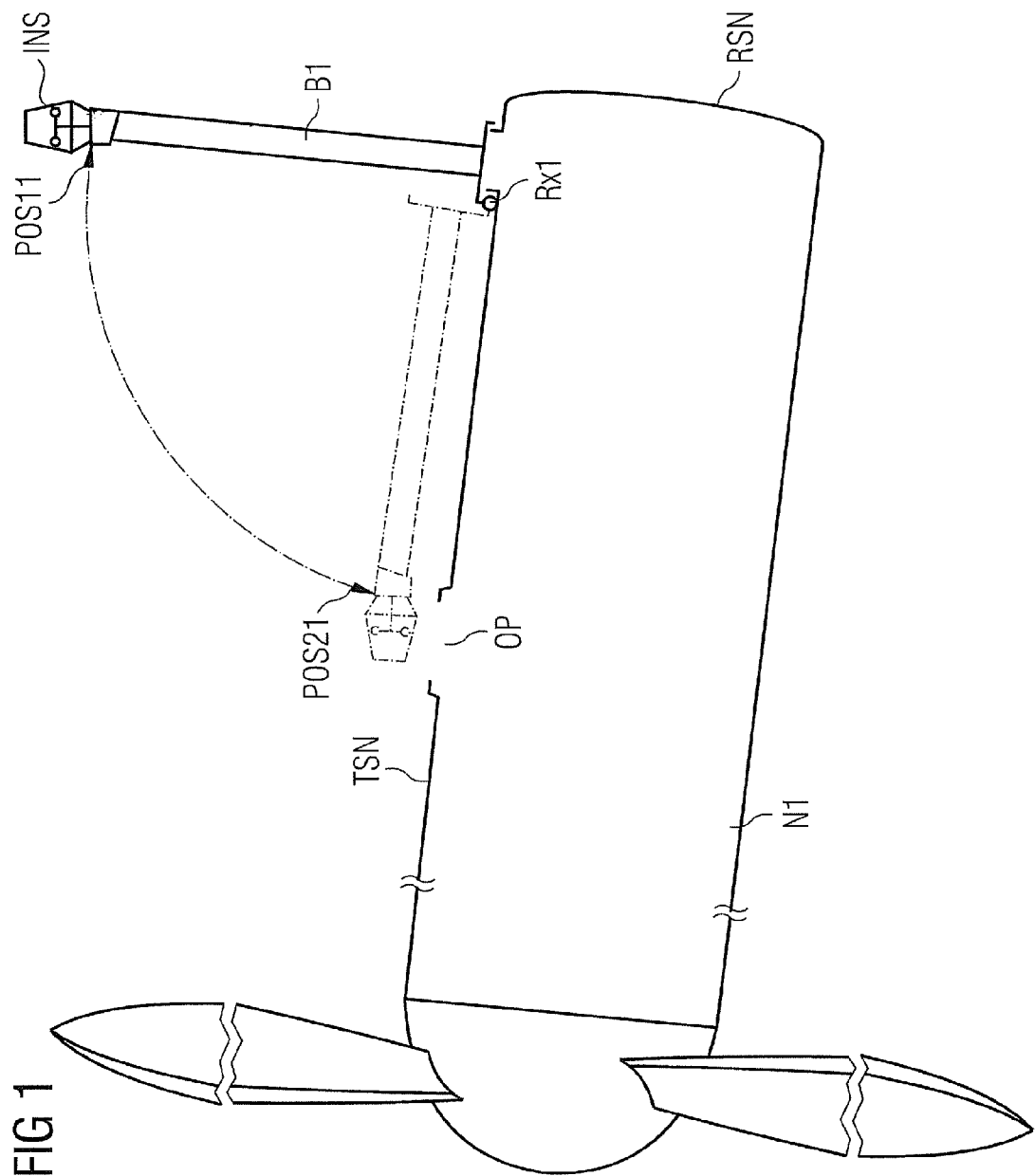
FIG. 1 shows the arrangement according to the invention.

FIG. 1 shows the arrangement according to the invention.

A nacelle N1 is connected with a rotational axis RX1. An instrument bar B1 is connected with the rotational axis RX1, too.

Thus the instrument bar B1 can be turned around the rotational axis RX1 between a first position POS11 and a second position POS12.

If the instrument bar B1 is turned in the first position POS11 the instrument bar B1 projects above the nacelle N1.

Thus the instruments INS of the instrument bar B1 can be used in this position POS11 to measure parameters of the environment or to be used as warning lights for example.

If the instrument bar B1 is turned in the second position POS12 the instrument bar B1 is close to an opening OP of the nacelle N1. Thus maintenance work of the instruments INS, repair-work of the instruments INS or the change of instrument INS is enabled and allowed from inside the nacelle N1.

Preferably the rotational axis RX1 is close to the top side TSN of the nacelle N1 and near to the rear side RSN of the nacelle N1.

Preferably the instrument bar B1 and the nacelle N1 are connected by flexible connection lines—not shown here in detail. They are used for communication purposes between means inside the nacelle and the instruments INS in the instrument bar B1.

Preferably the flexible connection lines are already joined at the production facility and thus are kept during a transportation of the components to the site of the wind turbine.

Figure 2:
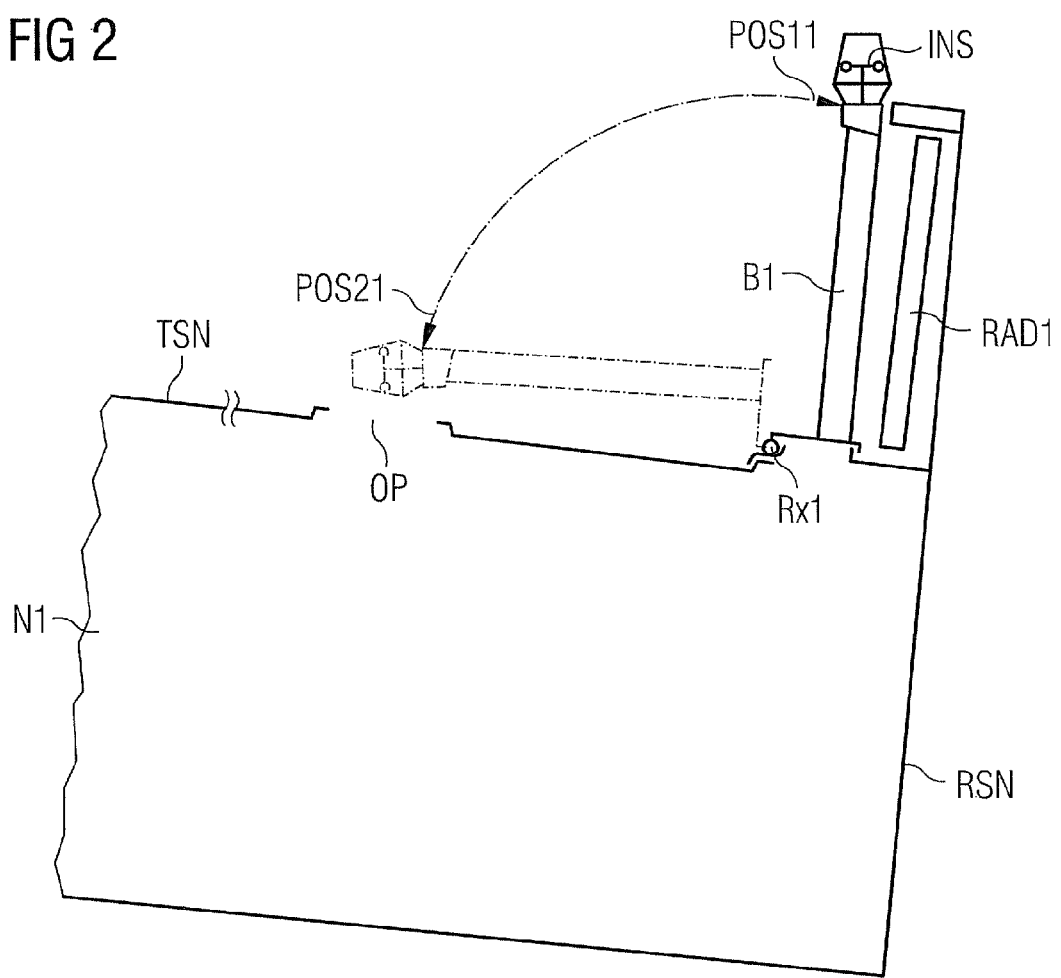
FIG. 2 shows a preferred configuration in reference to FIG. 1.

FIG. 2 shows a preferred configuration in reference to FIG. 1. The instrument bar B1 is at least partly integrated with a radiator RAD1 of the wind turbine. For both components a divided housing is used, which allows to adjust them to the environment aerodynamically.

Figure 3:
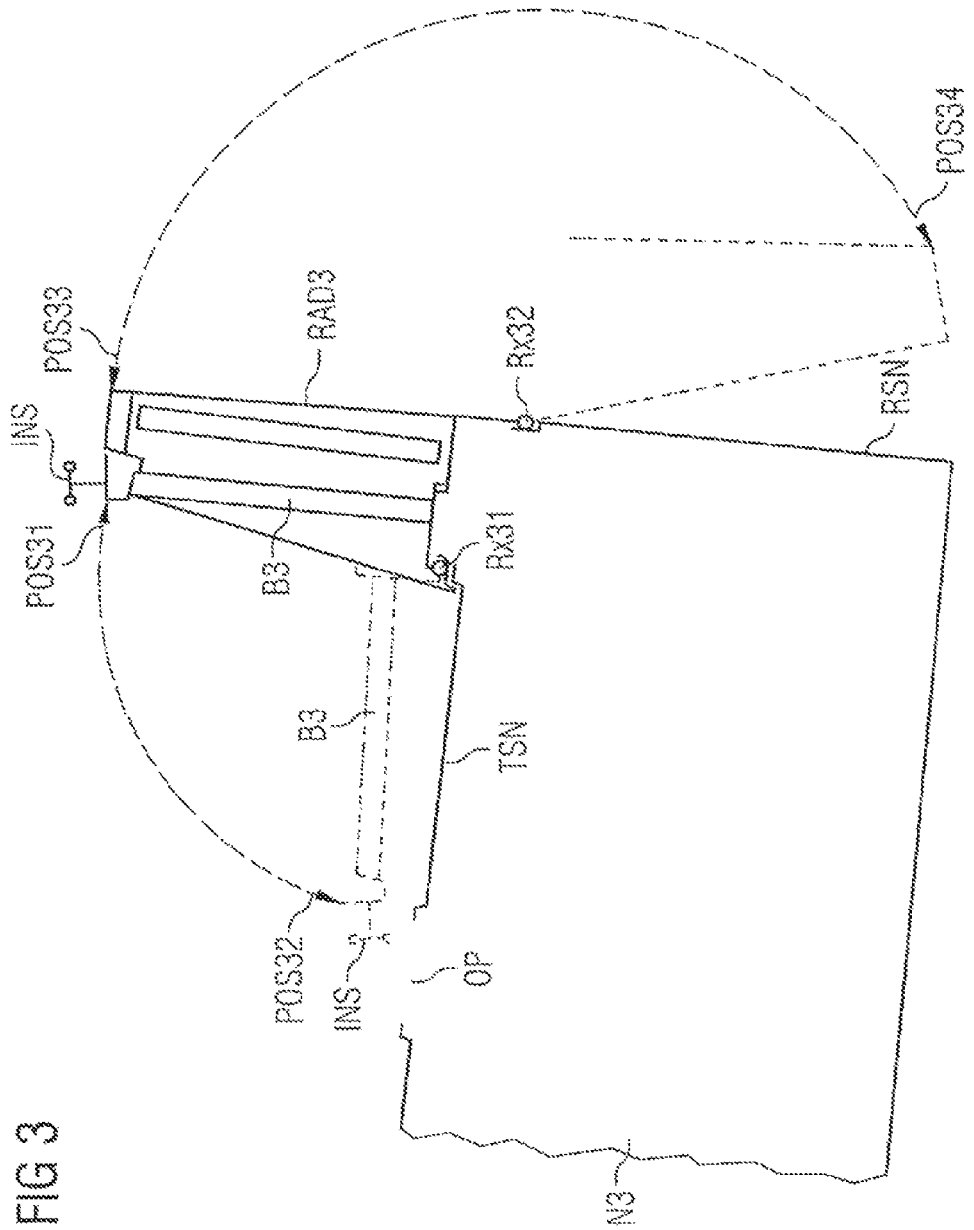
FIG. 3 shows a preferred configuration of the arrangement according to the invention.

FIG. 3 shows a preferred configuration of the arrangement according to the invention.

A nacelle N3 is connected with a second rotational axis RX32. A radiator RAD3 is connected with the second rotational axis RX32, too. Thus the radiator RAD3 can be turned around the second rotational axis RX32 between an upright position POS33 and position POS34.

If the radiator RAD3 is turned in the position POS33 the radiator RAD3 projects above the nacelle N3. Thus the radiator RAD3 can be used in this position POS33 to transmit heat, which is generated inside the nacelle N3, to the environment.

If the radiator RAD3 is turned in the position POS34 the radiator RAD3 does not project above the nacelle N3 or does only project by a certain height above the nacelle N3.

Thus the nacelle N3 and the radiator RAD3 show a common certain minimum height.

Preferably the rotational axis RX32 is close to the top side TSN of the nacelle N and near to its rear side RSN.

A bar B3 is used to carry instruments INS, which are used to measure the wind speed or other environmental parameters, for example. The instrument INS may be even part of a warning-system using lights for example.

The bar B3 is connected to a rotational axis RX31. The rotational axis RX31 is an integrated part of the radiator RAD3.

The bar B1 can be turned around the rotational axis RX31 between a first position POS31 and a second position POS32.

If the bar B1 is turned to the first position POS31 the bar B3 projects together with the radiator RAD3 above the nacelle N3. Thus the bar B3 can be operated in this position POS31, for example to measure environmental parameters for the wind turbine.

If the bar B3 is turned to the second position POS32 the bar B3 is close to the top side TSN of the nacelle N3. Thus the instruments INS can be adjusted, maintained, etc., from inside the nacelle N3 via the opening OP in the nacelle N3. Thus there is no need for personal to leave the nacelle N3 for the maintenance or service of the instruments INS.

As the rotational axis RX31 is an integrated part of the radiator RAD3, the radiator RAD3 and the bar B3 can be turned together around the rotational axis RX32. This position may be used for the transport of the nacelle, the radiator and the instrument bar to a wind turbine site.

Figure 4:
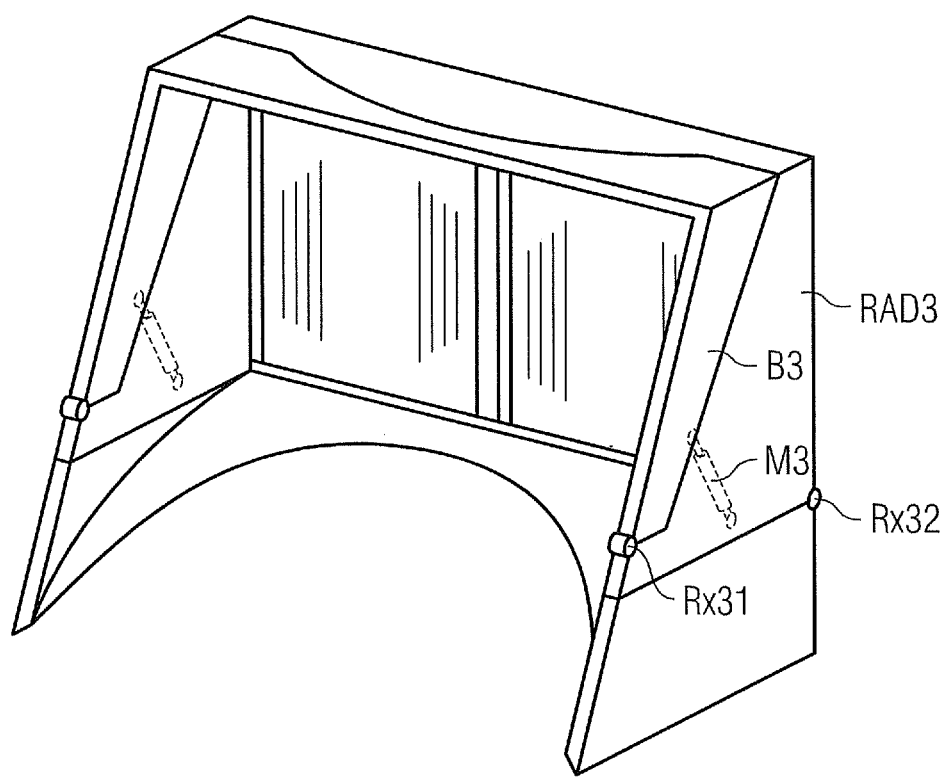
FIG. 4 shows details of the preferred configuration in reference to FIG. 3.

FIG. 4 shows details of the preferred configuration in reference to FIG. 3. To turn the bar B3 a motor M3 is used. The motor M3 may be an integrated part of the radiator RAD3.

The invention claimed is:

1. An arrangement, comprising:
a nacelle;
an instrument bar; and
a rotational axis,
wherein the instrument bar is arranged on top of the nacelle,
wherein the rotational axis interacts with the nacelle and the instrument bar,
wherein the rotational axis is constructed and arranged such that the instrument bar pivots between a first position and a second position in reference to the top side of the nacelle,
wherein the instrument bar projects above the top side of the nacelle when locked in the first position, while the instruments are operated, and
wherein the instrument bar is locked close to the top side of the nacelle in the second position to allow access to the instruments.

2. The arrangement according to claim 1, where the rotational axis is arranged close to the rear side of the nacelle.

3. The arrangement according to claim 1, wherein the instrument bar and the nacelle are connected by flexible tubes, the flexible tubes being used for a transfer of signals between the instrument bar and the nacelle.

4. The arrangement according to claim 2, wherein the instrument bar and the nacelle are connected by flexible tubes, the flexible tubes being used for a transfer of signals between the instrument bar and the nacelle.

5. The arrangement according to claim 1, wherein an electrical or a pneumatic or a hydraulic motor system is arranged at the instrument bar to change a position of the instrument bar.

6. The arrangement according to claim 1, wherein an electrical or a pneumatic or a hydraulic motor system is arranged at the nacelle to change a position of the instrument bar.

7. The arrangement according to claim 1, wherein an electrical or a pneumatic or a hydraulic motor system is arranged at the instrument bar and the nacelle to change a position of the instrument bar.

8. An arrangement, comprising:
a nacelle;
an instrument bar; and
a rotational axis,
wherein the instrument bar is arranged on top of the nacelle,
wherein the rotational axis is constructed and arranged such that the instrument bar pivots between a first position and a second position in reference to the top side of the nacelle,
wherein the instrument bar projects above the top side of the nacelle when locked in the first position, while the instruments are operated,
wherein the instrument bar is locked close to the top side of the nacelle in the second position to allow access to the instruments,
wherein a second rotational axis interacts with a radiator, the instrument bar and the nacelle,
wherein the radiator is constructed such that heat is transferred from the nacelle to an environment,
wherein the second rotational axis is constructed and arranged such that the radiator and the instrument bar pivot between a first radiator-position and a second radiator-position,
wherein the radiator and the instrument bar project above the nacelle in the first radiator-position, while the radiator is used to transfer heat from the nacelle to the environment and when the instruments are in operation, and
wherein the radiator and the instrument bar are close to the rear side of the nacelle in the second radiator-position in order to achieve a minimum height of a component which contains the nacelle, the radiator and the instrument bar.

9. The arrangement according to claim 8, wherein the second rotational axis is an integrated part of the radiator and wherein the second rotational axis is connected to the nacelle.

* * * * *